(12) United States Patent  (10) Patent No.: US 8,675,297 B2
Wilson et al.  (45) Date of Patent: Mar. 18, 2014

(54) MEDIA DEFECT CLASSIFICATION

(75) Inventors: Bruce Wilson, San Jose, CA (US); Ming Jin, Fremont, CA (US); Scott Dziak, Ft. Collins, CO (US)

(73) Assignee: LSI Corporation, Milpitas, CA (US)

( * ) Notice: Subject to any disclaimer, the term of this patent is extended or adjusted under 35 U.S.C. 154(b) by 74 days.

(21) Appl. No.: 13/525,194

(22) Filed: Jun. 15, 2012

(65) Prior Publication Data

US 2013/0335851 A1  Dec. 19, 2013

(51) Int. Cl.
*G11B 27/36* (2006.01)
(52) U.S. Cl.
USPC .............................................. 360/31; 360/25
(58) Field of Classification Search
USPC ............ 360/25, 31, 39, 45, 46, 75; 369/53.22
See application file for complete search history.

(56) References Cited

U.S. PATENT DOCUMENTS

| | | |
|---|---|---|
| 4,646,173 A | 2/1987 | Kammeyer et al. |
| 5,802,069 A | 9/1998 | Coulson |
| 6,065,149 A | 5/2000 | Yamanaka |
| 6,301,679 B1 | 10/2001 | Tan |
| 6,446,236 B1 | 9/2002 | McEwen et al. |
| 6,480,871 B1 | 11/2002 | Phatak |
| 6,557,113 B1 | 4/2003 | Wallentine |
| 6,691,263 B2 | 2/2004 | Vasic et al. |
| 6,697,977 B2 | 2/2004 | Ozaki |
| 6,731,442 B2 | 5/2004 | Jin et al. |
| 6,738,948 B2 | 5/2004 | Dinc et al. |
| 6,980,382 B2 | 12/2005 | Hirano et al. |
| 7,154,936 B2 | 12/2006 | Bjerke et al. |
| 7,168,030 B2 | 1/2007 | Ariyoshi |
| 7,203,015 B2 | 4/2007 | Sakai et al. |
| 7,237,173 B2 | 6/2007 | Morita et al. |
| 7,254,192 B2 | 8/2007 | Onggosanusi et al. |
| 7,257,172 B2 | 8/2007 | Okamoto et al. |
| 7,359,313 B2 | 4/2008 | Chan et al. |
| 7,441,174 B2 | 10/2008 | Li et al. |
| 7,457,212 B2 | 11/2008 | Oh |
| 7,652,966 B2 | 1/2010 | Kadokawa |
| 7,688,915 B2 | 3/2010 | Tanrikulu et al. |

(Continued)

FOREIGN PATENT DOCUMENTS

| | | |
|---|---|---|
| EP | 0549151 | 6/1993 |
| EP | 1096491 | 10/2005 |

(Continued)

OTHER PUBLICATIONS

Bagul "Assessment of current health and remaining useful life of hard disk drives" [online] Jan. 1, 2009 [ret. Oct. 14, 2010] Ret. from internet:<URL;http://iris.lib.neu.edu.

(Continued)

*Primary Examiner* — Nabil Hindi
(74) *Attorney, Agent, or Firm* — Hamilton DeSanctis & Cha

(57) ABSTRACT

The present inventions are related to apparatuses and methods for detecting and classifying media defects. For example, an apparatus for classifying a media defect is disclosed including a DFT circuit operable to yield real and imaginary components of a signal derived from data read from a storage medium, a calculation circuit operable to calculate an amplitude and a phase of the signal based on the real and imaginary components, and a classifier operable to detect the media defect based on the amplitude and to classify the media defect based on the phase.

22 Claims, 8 Drawing Sheets

(56) References Cited

U.S. PATENT DOCUMENTS

| | | | |
|---|---|---|---|
| 7,702,973 | B2 | 4/2010 | Mead et al. |
| 7,849,385 | B2 | 12/2010 | Tan et al. |
| 7,852,722 | B2 | 12/2010 | Kikugawa et al. |
| 7,924,518 | B2 | 4/2011 | Mathew et al. |
| 7,952,824 | B2 | 5/2011 | Dziak et al. |
| 8,031,420 | B2 * | 10/2011 | Mathew et al. .......... 360/31 |
| 8,095,855 | B2 | 1/2012 | Tan et al. |
| 8,121,224 | B2 | 2/2012 | Tan et al. |
| 8,139,457 | B2 | 3/2012 | Cao et al. |
| 8,149,527 | B2 | 4/2012 | Tan et al. |
| 8,161,357 | B2 | 4/2012 | Tan et al. |
| 8,176,400 | B2 | 5/2012 | Tan et al. |
| 8,190,831 | B2 | 5/2012 | Lee et al. |
| 8,201,051 | B2 | 6/2012 | Tan et al. |
| 8,219,892 | B2 | 7/2012 | Tan et al. |
| 2003/0043487 | A1 | 3/2003 | Morita et al. |
| 2006/0200510 | A1 | 9/2006 | Wang et al. |
| 2007/0061687 | A1 | 3/2007 | Hwang |
| 2010/0042877 | A1 | 2/2010 | Tan |
| 2010/0229031 | A1 | 9/2010 | Tan |
| 2010/0268996 | A1 | 10/2010 | Yang |
| 2010/0269023 | A1 | 10/2010 | Yang |
| 2011/0205653 | A1 | 8/2011 | Mathew |
| 2011/0209026 | A1 | 8/2011 | Xia |
| 2012/0087033 | A1 | 4/2012 | Yang |
| 2012/0254679 | A1 | 10/2012 | Tan |
| 2012/0266055 | A1 | 10/2012 | Zhang |

FOREIGN PATENT DOCUMENTS

| | | |
|---|---|---|
| JP | 10-145243 | 5/1998 |
| JP | 2007-087529 | 4/2007 |
| WO | WO 01/39188 | 5/2001 |

OTHER PUBLICATIONS

Duprat et al., "The CORDIC Algorithm: New Results for Fast VLSI Implementation", IEEE Transactions on Computers, vol. 42, No. 2, pp. 168-178 (Feb. 1993).

ECMA: Standardizing Information and Communication Systems: "Standard ECMA-272: 120 mm DVD Rewritable Disk (DVD-RAM)" Standard ECMA, No. 272, pp. 43-51, (Feb. 1998 ).

Galbraith et al, "Iterative Detection Read Channel Technology in Hard Disk Drives" [online] Oct. 1, 2008 [ret. on Oct. 1, 2008] Ret. from Internet<URL:http://www.hitachigst.com.

Hu, "CORDIC-based VLSI Architectures for Digital Signal Processing", IEEE Signal Processing Magazine, pp. 16-35 (Jul. 1992).

Kavcic et al., "A Signal-Dependent Autoregressive Channel Model", IEEE Transactions on Magnetics, vol. 35, No. 5, Sep. 1999 pp. 2316-2318.

Phatak, "Double Step Branching CORDIC: A New Algorithm for Fast Sine and Cosine Generation," IEEE Transactions on Computers, vol. 47, No. 5, pp. 587-602 (May 1998).

Singh et al., "Comparison of Branching CORDIC Implementations", Application-Specific Systems, Architectures, and Processors, 2003, Proc IEEE Int. Conf., 15 pages (Jun. 2003).

U.S. Appl. No. 13/459,289, Unpublished filed Apr. 30, 2012, Fan Zhang.

U.S. Appl. No. 13/213,789, Unpublished filed Aug. 19, 2011, Ming Jin.

U.S. Appl. No. 13/452,722, Unpublished filed Apr. 20, 2012, Shaohua Yang.

U.S. Appl. No. 13/368,599, Unpublished filed Feb. 8, 2012, Yang Cao.

Volder, "The CORDIC Trigonometric Computing Technique", IRE Trans.Electronic Computers, vol. EC-8, No. 3, pp. 330-334 (Sep. 1959).

* cited by examiner

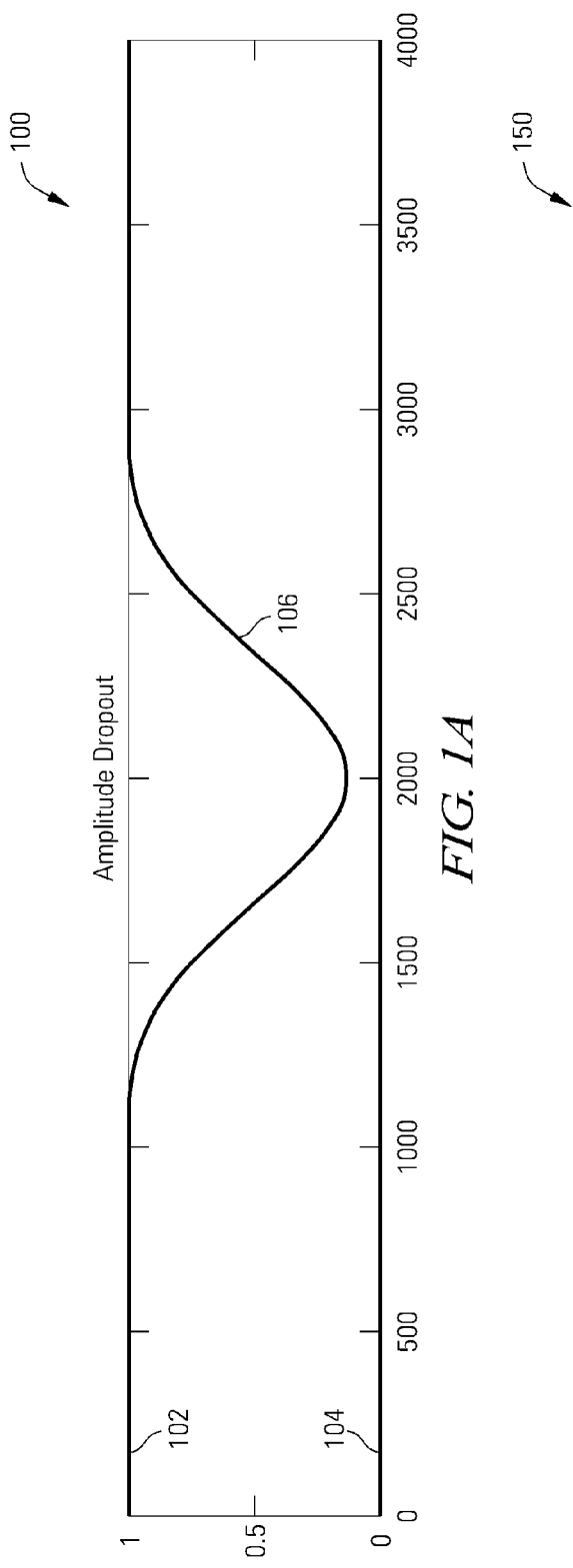
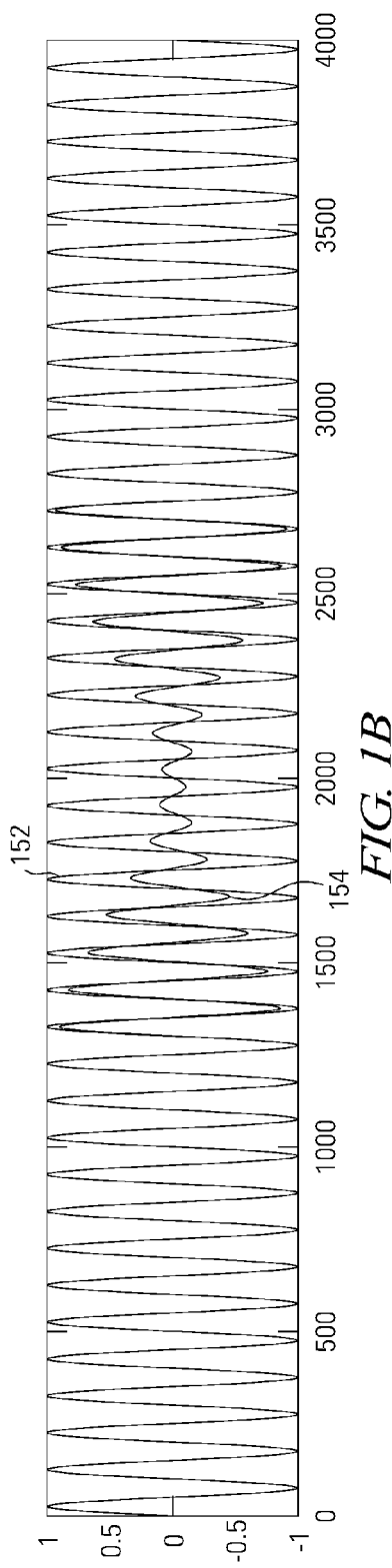

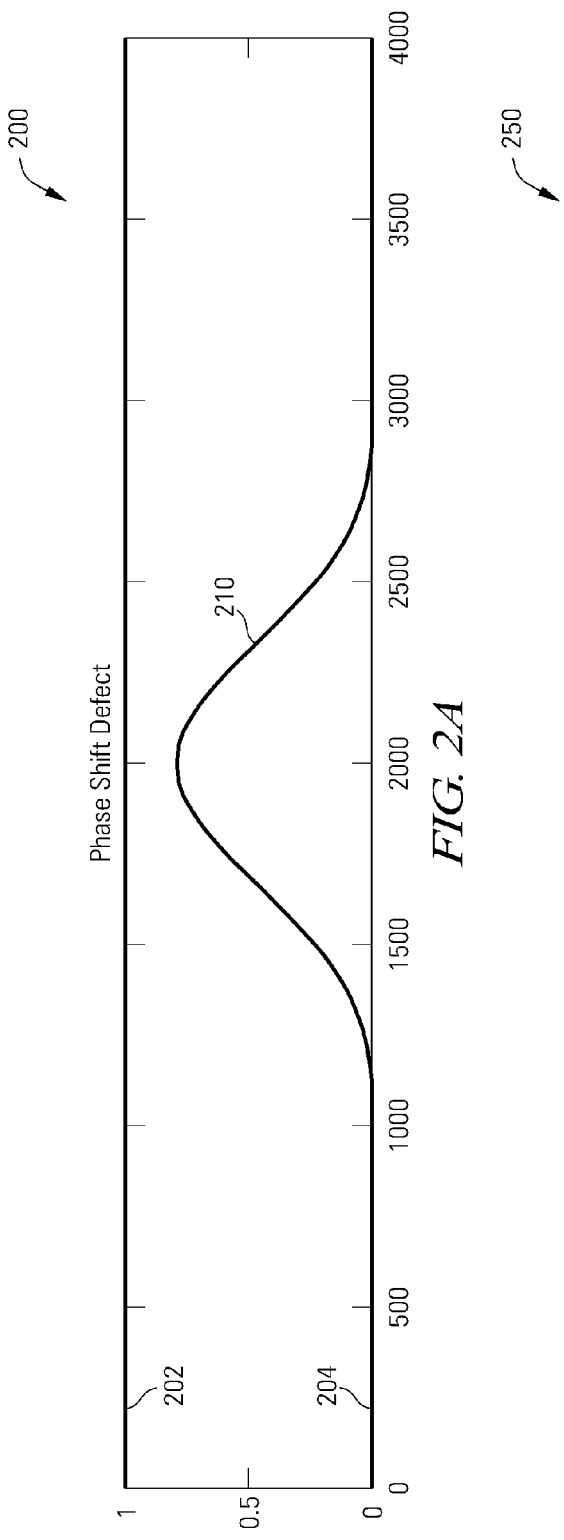
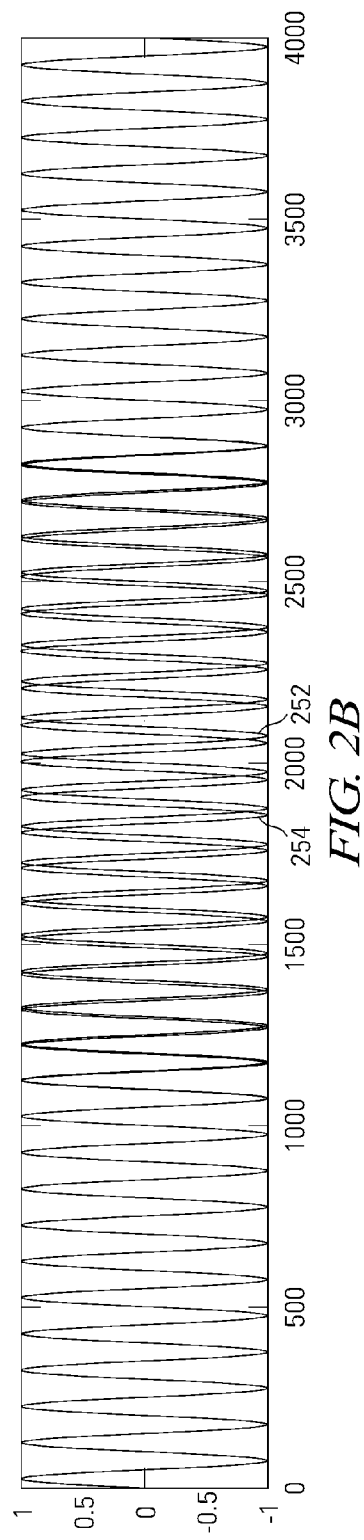
FIG. 2A
FIG. 2B

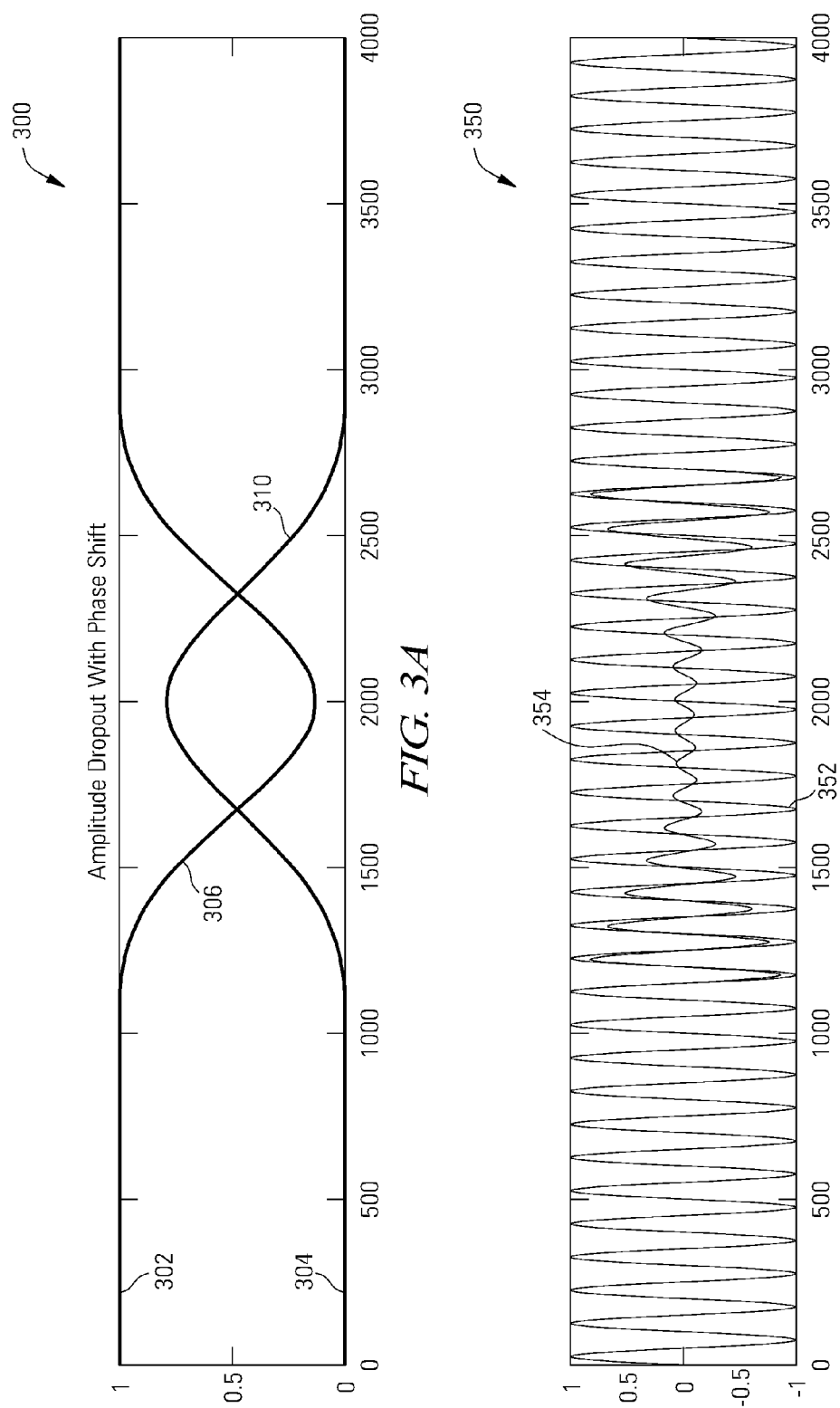

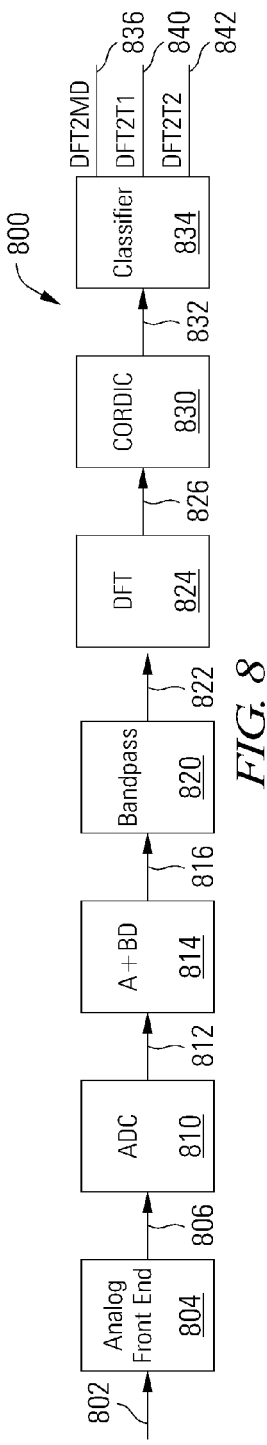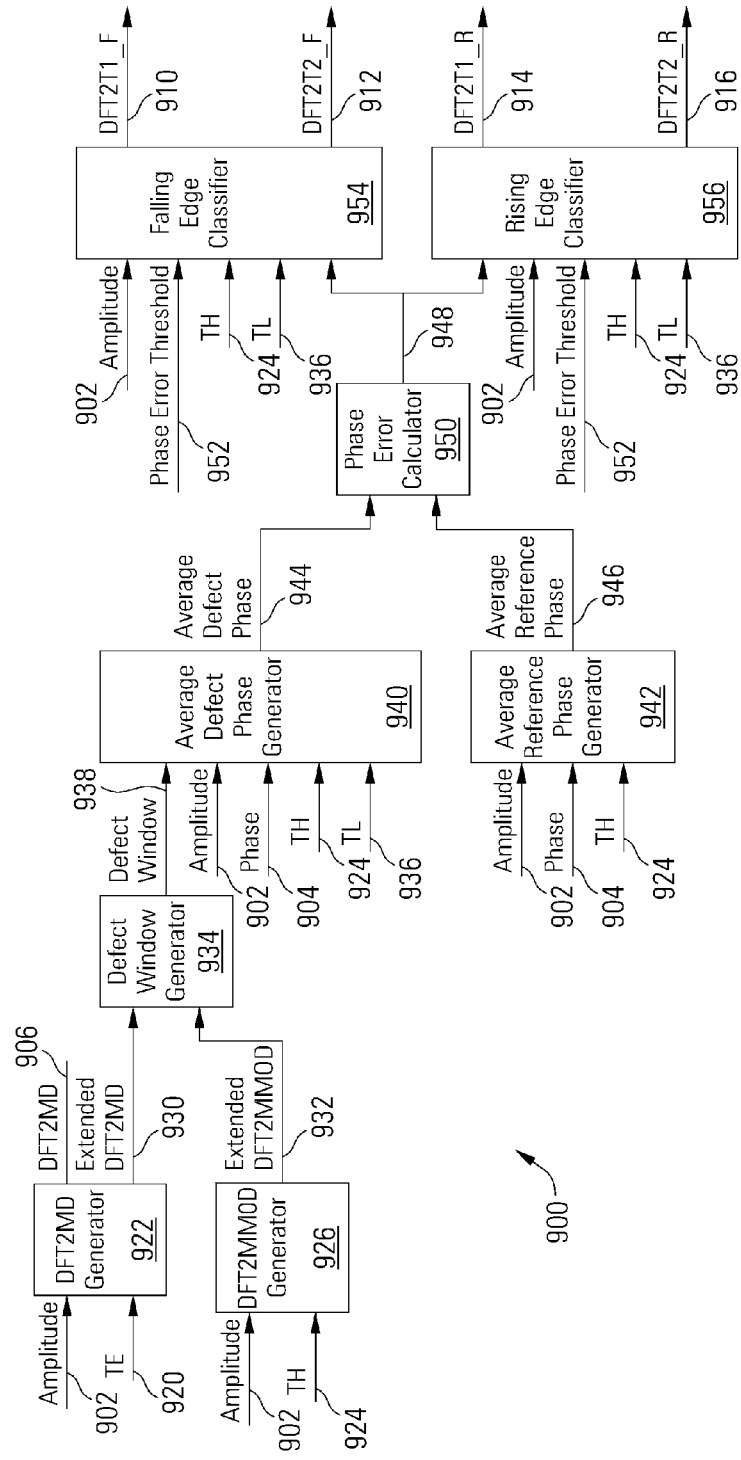

MEDIA DEFECT CLASSIFICATION

BACKGROUND

In a typical magnetic storage system such as a magnetic hard disk, digital data is stored in a series of concentric circles or spiral tracks along a storage medium. Data is written to the medium by positioning a read/write head assembly over the medium at a selected location as the storage medium is rotated, and subsequently passing a modulated electric current through the head assembly such that a corresponding magnetic flux pattern is induced in the storage medium. To retrieve the stored data, the head assembly is positioned anew over the track as the storage medium is rotated. In this position, the previously stored magnetic flux pattern induces a current in the head assembly that can be converted to the previously recorded digital data.

Physical defects in the storage medium can cause errors when writing and reading data on the storage medium. A need exists for a method of detecting and classifying media defects in an efficient and non-destructive manner.

BRIEF SUMMARY

The present inventions are related to apparatuses and methods for detecting and classifying media defects, and more particularly to detecting and classifying media defects on a magnetic disk platter. Such media defects may include, for example, pits and protrusions or other defects on the surface of a magnetic disk platter. A media defect classifier is disclosed herein which detects and classifies two types of defects. A type 1 defect is classified by an amplitude dropout in a signal derived from reading the storage medium as it is processed by the media defect classifier. A type 2 defect is classified by an amplitude dropout and a phase excursion in a signal derived from reading the storage medium as it is processed by the media defect classifier. The defect classification may be performed at both the falling and rising edge of the amplitude dropout corresponding to a media defect.

In some embodiments, a Discrete Fourier Transform (DFT) and a COordinate Rotation DIgital Computer (CORDIC) are used to calculate the amplitude and phase of a signal read from a magnetic storage media, and a classifier circuit detects and classifies the medias defects based on the amplitude and phase.

This summary provides only a general outline of some embodiments according to the present invention. Many other objects, features, advantages and other embodiments of the present invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components.

FIG. 1A is a graph of amplitude and phase error calculated by a media defect classifier for an example sinusoidal signal, with an amplitude dropout due to a type 1 media defect in accordance with some embodiments of the present inventions;

FIG. 1B is a graph of the ideal example sinusoidal signal of FIG. 1A examined by the media defect classifier and of the example sinusoidal signal resulting from the type 1 media defect in accordance with some embodiments of the present inventions;

FIG. 2A is a graph of amplitude and phase error calculated by a media defect classifier for an example sinusoidal signal, with a phase excursion due to a type 2 media defect in accordance with some embodiments of the present inventions;

FIG. 2B is a graph of the ideal example sinusoidal signal of FIG. 2A examined by the media defect classifier and of the example sinusoidal signal resulting from the type 2 media defect (omitting amplitude dropout effect due to type 2 media defect for clarity) in accordance with some embodiments of the present inventions;

FIG. 3A is a graph of amplitude and phase error calculated by a media defect classifier for an example sinusoidal signal, with a phase excursion and amplitude dropout due to a type 2 media defect in accordance with some embodiments of the present inventions;

FIG. 3B is a graph of the ideal example sinusoidal signal of FIG. 3A examined by the media defect classifier and of the example sinusoidal signal resulting from the type 2 media defect, showing both the phase excursion and amplitude dropout due to a type 2 media defect in accordance with some embodiments of the present inventions;

FIG. 8 is a block diagram of a media defect classifier in accordance with some embodiments of the present inventions;

FIG. 9 is a block diagram of a classifier circuit in a media defect classifier in accordance with some embodiments of the present inventions;

DETAILED DESCRIPTION OF THE INVENTION

Figure 4A:
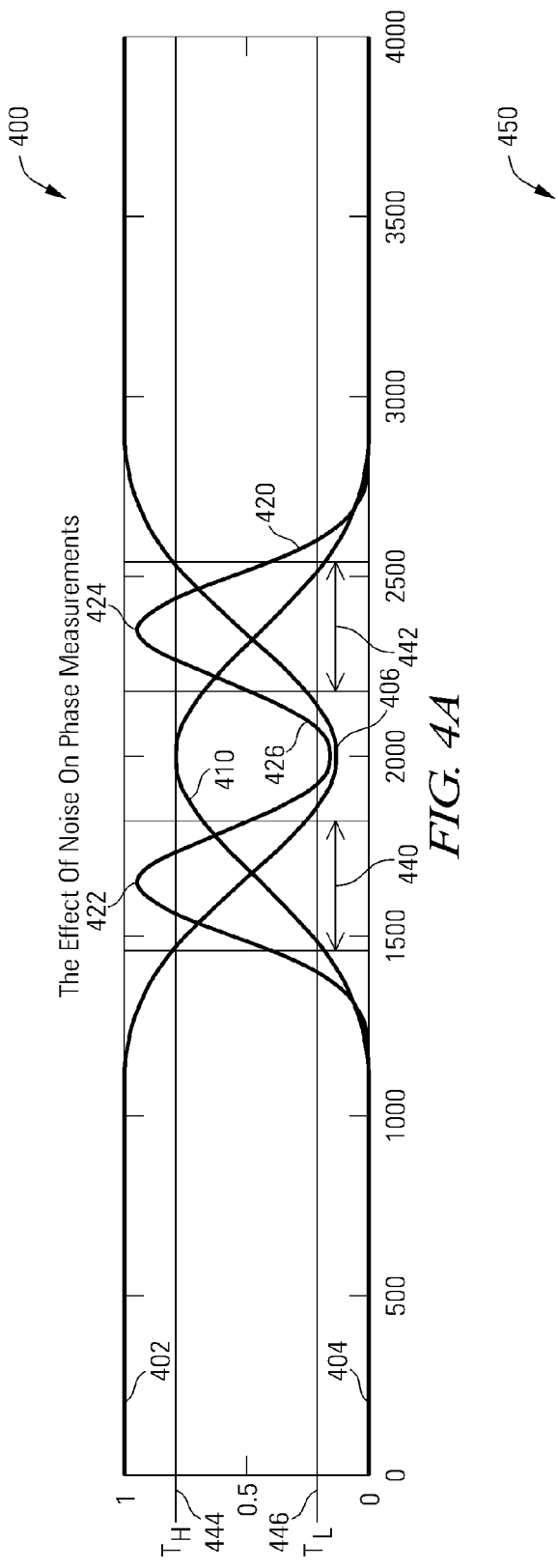
FIG. 4A is a graph of amplitude, phase error and phase error measurement PNR for an example sinusoidal signal, with a phase excursion and amplitude dropout due to a type 2 media defect in accordance with some embodiments of the present inventions.

The present inventions are related to apparatuses and methods for detecting and classifying media defects, and more particularly to detecting and classifying media defects on a magnetic disk platter. Such media defects may include, for example, pits and protrusions or other defects on the surface of a magnetic disk platter. A media defect classifier is disclosed herein which detects and classifies two types of defects. A type 1 defect is classified by an amplitude dropout in a signal derived from reading the storage medium as it is processed by the media defect classifier. A type 2 defect is classified by an amplitude dropout and a phase excursion in a signal derived from reading the storage medium as it is processed by the media defect classifier. The defect classification may be performed at both the falling and rising edge of the amplitude dropout corresponding to a media defect.

The media detection and classification disclosed herein may be performed during the manufacturing and testing process using an efficient, high throughput, low labor and non-destructive manner that facilitates control and improvement of the manufacturing process. The media detection and classification disclosed herein may also be performed in an operating storage device, for example during self-test operations that may be performed while partitioning and formatting a magnetic hard disk to identify sectors with defects to be left unused. A media defect classifier may therefore be incorporated, for example, into test equipment used during manufacturing or into a read channel that reads and writes data during normal operation.

Turning to FIG. 1A, a graph 100 depicts the amplitude 102 and phase error 104 by a media defect classifier for an example sinusoidal signal, with an amplitude dropout 106 due to a type 1 media defect in accordance with some embodiments of the present inventions. In this example, the amplitude calculated by the media defect classifier for a signal read from the storage medium drops as a read/write head passes over the defect in the storage medium. A graph 150 in FIG. 1B depicts an ideal example sinusoidal signal 152 read from the storage medium and processed by the media defect classifier, as it would appear in the absence of a media defect. A corresponding defect sinusoidal signal 154 depicts the effect of the amplitude dropout 106 on the ideal example sinusoidal signal 152, where the magnitude of the defect sinusoidal signal 154 is reduced at the defect in the storage medium. Notably, in this example, the phase error 104 is zero, and the phase of the ideal example sinusoidal signal 152 and the defect sinusoidal signal 154 is the same. The media defect classifier will therefore classify this as a type 1 media defect.

Turning to FIG. 2A, a graph 200 depicts the amplitude 202 and phase error 204 calculated by a media defect classifier for an example sinusoidal signal, with a phase excursion 210 or phase shift due to a type 2 media defect in accordance with some embodiments of the present inventions. Although the type 2 media defect causes both an amplitude dropout (e.g., 106) and a phase excursion 210, FIGS. 2A and 2B show only the phase excursion to more clearly illustrate the phase shift that occurs with one type of defect and can therefore be used to distinguish between type 1 and type 2 defects. Because the amplitude dropout (e.g., 106) occurs with both type 1 and type 2 defects, it is used in the media defect classifier to trigger detection of a defect, and the presence or absence of the phase shift 210 illustrated in FIGS. 2A and 2B is used to distinguish between type 1 and type 2 defects. In this example, the phase shift calculated by the media defect classifier for a signal read from the storage medium increases as a read/write head passes over the defect in the storage medium. The graph 250 in FIG. 2B depicts an ideal example sinusoidal signal 252 read from the storage medium and processed by the media defect classifier, as it would appear in the absence of a media defect. A corresponding defect sinusoidal signal 254 depicts the effect of the phase shift 210 on the ideal example sinusoidal signal 252, where the phase of the defect sinusoidal signal 254 is shifted at the defect in the storage medium, and in this example delayed. The media defect classifier will therefore classify this as a type 2 media defect.

In some embodiments, the media defect classifier also detects and classifies a type 3 defect, based on a phase excursion without a substantial amplitude dropout, as illustrated in FIGS. 2A and 2B. In these embodiments, the media defect classifier yields an additional output signal indicating that the type 3 defect has been detected. Although example circuit block diagrams are disclosed herein for embodiments that detect and classify type 1 and type 2 defects, in which an amplitude dropout is detected without a substantial phase excursion, and in which both an amplitude dropout and phase excursion are detected, respectively, one of ordinary skill in the art will recognize a variety of apparatuses and methods that may be applied in the media defect classifier to detect and classify a type 3 defect in which a phase excursion without a substantial amplitude dropout based upon the disclosure provided herein.

In FIGS. 3A and 3B, graph 300 depicts both the amplitude dropout 306 and phase shift 310 in the amplitude 302 and phase error 304 caused by a type 2 defect. Again, the amplitude and phase error are calculated by the media defect classifier for a signal read from the storage medium drops as a read/write head passes over the defect in the storage medium. The amplitude 302 experiences the dropout 306, and the phase error 304 experiences the shift 310, as the read/write head reads the signal at the defect in the storage medium. Graph 350 in FIG. 3B depicts an ideal example sinusoidal signal 352 read from the storage medium and processed by the media defect classifier, as it would appear in the absence of a media defect. A corresponding defect sinusoidal signal 354 depicts the effect of the amplitude dropout 306 and the phase shift 310 on the ideal example sinusoidal signal 352, where the magnitude of the defect sinusoidal signal 354 is reduced and the phase error 310 creates a delaying phase shift in this example at the defect in the storage medium. Because the phase shift 310 is non-zero during the amplitude dropout 306, the media defect classifier will classify this as a type 2 media defect.

Turning to FIG. 4A, graph 400 depicts the 402 depicts the amplitude 402 and phase error 404 calculated by a media defect classifier for an example sinusoidal signal, with an amplitude dropout 406 and a phase excursion 410 due to a type 2 media defect in accordance with some embodiments of the present inventions. The conditional phase error to noise ratio (PNR) 420 of the phase error 404 is also shown, which is the phase error to noise ratio when the amplitude 402 is greater than a lower threshold $T_L$ 446. Notably, the PNR 420 grows at the falling and rising edges of the amplitude dropout 406 in the amplitude 402, when the phase error 404 begins to increase but the amplitude 402 has not yet reached a low level. When the read/write head gets into the media defect and the amplitude 402 drops, any perturbation on the rapidly diminishing sinusoid (e.g., 354) or other signal read from the storage medium produces a relatively large change in the phase of the sinusoid, so at the very low amplitude regions, the phase cannot be measured accurately. The PNR 420 therefore has peaks 422 and 424 at the falling and rising edges of the amplitude dropout 406 in the amplitude 402 and a valley 426 at the greatest amplitude dropout, making the phase error measurements most accurate in the media defect classifier during the falling and rising edges when the phase error increases but the amplitude is not too low.

Figure 4B:
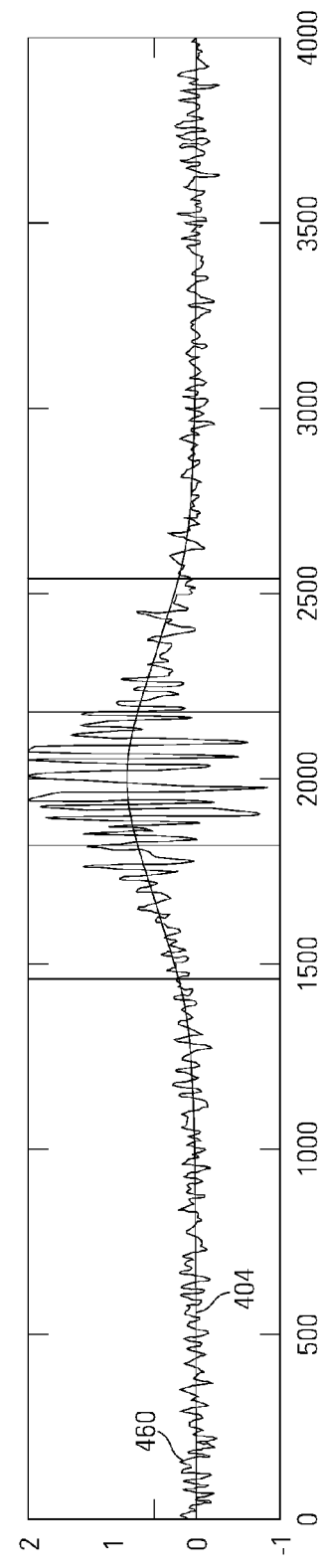
FIG. 4B is a graph of phase error and a noisy phase error measurement in a media defect classifier, particularly at the extreme of an amplitude dropout due to a type 2 media defect, and illustrating example phase error integration windows in a media defect classifier in accordance with some embodiments of the present inventions.

The noise in the phase error measurement due to low PNR 420, particularly during the lowest portion of the amplitude dropout 406 in amplitude 402, is depicted in graph 450 in FIG. 4B. The ideal phase error 404 in FIG. 4B matches that in FIG. 4A, although at a different scale in the graph 450. The noisy phase measurement 460 depicts a more realistic phase error measurement for a signal read from a storage medium by a read/write head and calculated in the media defect classifier. As the amplitude 402 reaches the lowest portion of the amplitude dropout 406 and the PNR 420 reaches valley 426, the noise in phase measurement 460 becomes great enough that accurate phase measurements cannot be produced in some instances.

The media defect classifier therefore integrates the phase error during windows 440 and 442 which are positioned at the falling and rising edges of the amplitude dropout 406. Windows 440 and 442 are established by thresholds $T_H$ 444 (or higher threshold) and $T_L$ 446 (or lower threshold). Window 440 at the falling edge of amplitude dropout 406 begins when amplitude 402 falls below threshold $T_H$ 444, and ends when amplitude 402 falls below threshold $T_L$ 446. Window 442 at the rising edge of amplitude dropout 406 begins when amplitude 402 rises past threshold $T_L$ 446, and ends when amplitude 402 rises past threshold $T_H$ 444.

Figure 5:
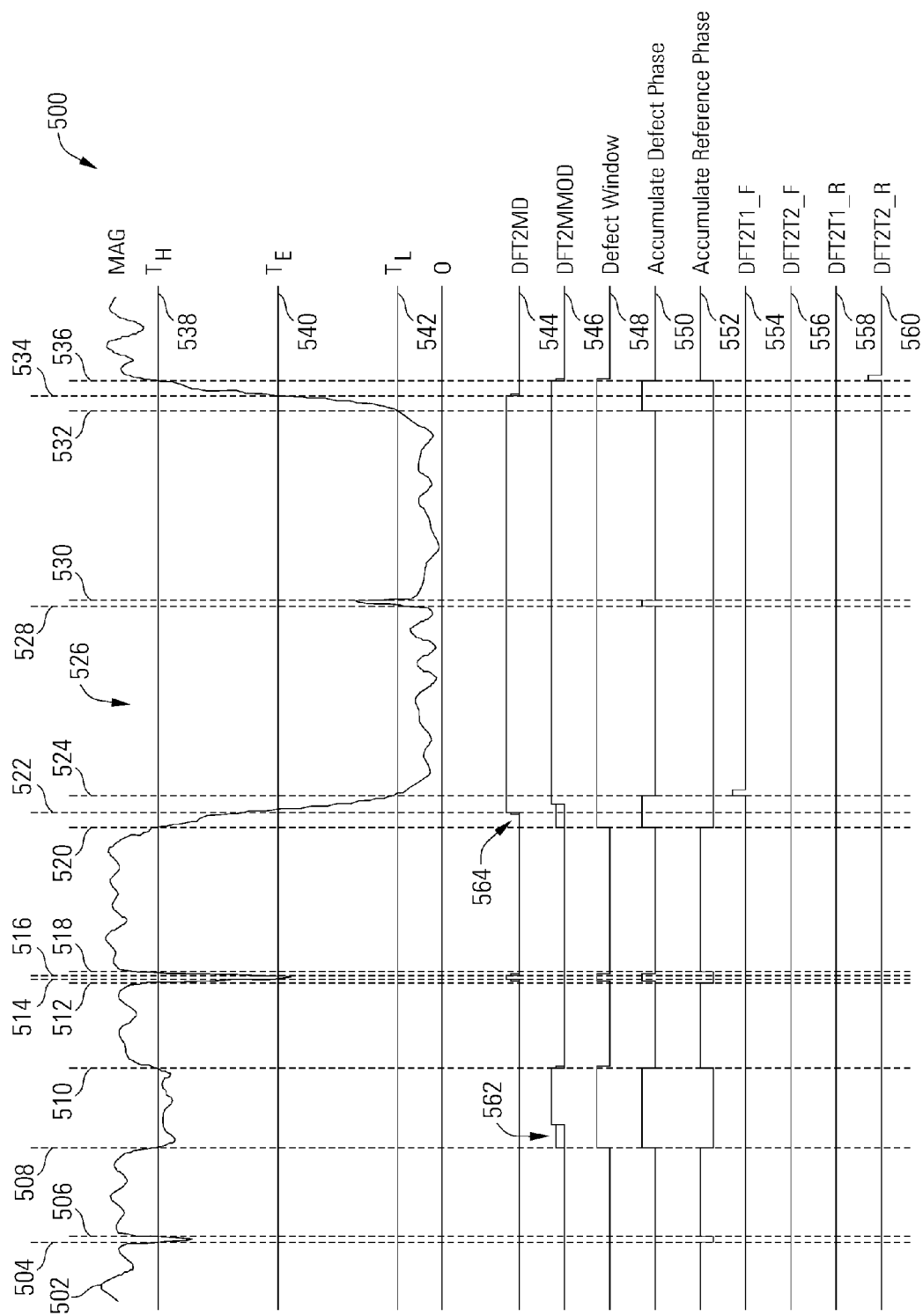
FIG. 5 is a graph of amplitude dropout corresponding to output signals generated by an example media defect classifier in various operating conditions in accordance with some embodiments of the present inventions.

Turning to FIG. 5, a graph 500 depicts an example amplitude 502 calculated by a media defect classifier for an example signal read from a storage medium with a media defect. The media defect classifier calculates the amplitude and phase of a signal read from a storage medium using a Discrete Fourier Transform (DFT), detects a media defect based on a drop in amplitude and classifies the media defect type based on phase shift in the signal. The media defect classifier is not limited to any particular algorithms or circuits for tracking amplitude drops and phase shifts to detect and classify media defects. Based upon the disclosure provided herein, one of ordinary skill in the art will recognize a variety of apparatuses and methods that may be applied in the media defect classifier to track amplitude drops and phase shifts. In some embodiments, phase shifts are detected by accumulating an average reference phase and an average defect phase over an entire read event, or read gate. In other embodiments, the time over which the average reference phase and the average defect phase are accumulated is limited to reduce hardware requirements. In general, the reference phase is collected and averaged in the absence of a media defect, and the defect phase is collected and averaged at media defects. The media defect classifier may use a variety of techniques for identifying the conditions during which the average reference phase is accumulated and the conditions during which the average defect phase is accumulated, and is not limited to the examples disclosed herein.

In some embodiments, the media defect classifier generates a number of output signals and control signals, including a Defect Window signal 548 that is asserted when media defects are detected, a DFT2MD signal 544 and DFT2MMOD signal 546 that are used to generate the Defect Window signal 548, an Accumulate Defect Phase signal 550 that is asserted when the average defect phase is accumulated and an Accumulate Reference Phase signal 552 that is asserted when the average reference phase is accumulated. The output signals and control signals are based in some embodiments on the state of the amplitude 502 with respect to a threshold $T_E$ 540, a higher threshold $T_H$ 538, and a lower threshold $T_L$ 542, where $T_H$ 538>$T_E$ 540>$T_L$ 542. The levels of threshold $T_E$ 540, higher threshold $T_H$ 538, and lower threshold $T_L$ 542 may be programmable, for example by setting values in registers in the media defect classifier.

The DFT2MD signal 544 is asserted during a media defect event, although there is some delay between the time that the read/write head assembly reads the signal from a media defect and the output from the media defect classifier. The DFT2MD signal 544 is asserted when the amplitude 502 is below a threshold $T_E$ 540. The DFT2MMOD signal 546 is also asserted during a media defect event, when the time duration that the amplitude 502 is below higher threshold $T_H$ 538 exceeds an MMOD threshold. For example, in some embodiments, the DFT2MMOD signal 546 is asserted when the amplitude 502 has been below higher threshold $T_H$ 538 for 8 consecutive 4T measurements, or 32T, and remains asserted for as long as the amplitude 502 remains below higher threshold $T_H$ 538.

The Defect Window signal 548 is asserted based on extended versions of the DFT2MD signal 544 and the DFT2MMOD signal 546. The extended DFT2MD signal 544 consists of the DFT2MD signal 544, extended forwards and backwards by 4T at each end. (The extension periods are illustrated by half-height regions, e.g. 562, 564, on the DFT2MD signal 544 at the start and end of asserted regions.) The leading and trailing edges of the DFT2MMOD signal 546 are also extended by a given amount of time, for example by 32T and 4T, respectively. The Defect Window signal 548 is set by the logical OR of the extended DFT2MD signal 544 and extended DFT2MMOD signal 546. The The Accumulate Defect Phase signal 550 is asserted when the Defect Window signal 548 is asserted and the amplitude 502 is between the higher threshold $T_H$ 538 and lower threshold $T_L$ 542, or $T_L$ 542<amplitude 502<$T_H$ 538. In other words, the defect phase is accumulated or averaged during the defect window 548 when the amplitude 502 is between the higher threshold $T_H$ 538 and the lower threshold $T_L$ 542. The Accumulate Reference Phase signal 552 is asserted and the reference phase is accumulated or averaged when the amplitude 502 is greater than the higher threshold $T_H$ 512.

The media defect classifier may generate one output signal to indicate a type 1 defect and one output signal to indicate a type 2 defect, or may generate two output signals for each defect type, differentiating between defects detected at the rising and falling edges of an amplitude dropout 526. In the embodiment which differentiates between the rising and falling edges, the media defect classifier generates a DFT2T1_F signal 554 when a type 1 defect is detected at the falling edge of an amplitude dropout 526, a DFT2T2_F signal 556 when a type 2 defect is detected at the falling edge of an amplitude dropout 526, a DFT2T1_R signal 558 when a type 1 defect is detected at the rising edge of an amplitude dropout 526, and a DFT2T2_R signal 560 when a type 2 defect is detected at the rising edge of an amplitude dropout 526. The DFT2T1_F signal 554 or the DFT2T2_F signal 556 is pulsed when the amplitude 502 falls below the lower threshold $T_L$ 542 to indicate either a type 1 defect or a type 2 defect, and the DFT2T1_R signal or the DFT2T2_R signal 560 is pulsed when the amplitude 502 rises past the higher threshold $T_H$ 538 after falling below the lower threshold $T_L$ 542. When the amplitude 502 falls below the lower threshold $T_L$ 542, if the absolute difference between the average reference phase and the average defect phase is not greater than a phase error threshold, the DFT2T1_F signal 554 is pulsed to indicate a type 1 defect, and if it is greater than the phase error threshold, the DFT2T2_F signal 556 is pulsed to indicate a type 2 defect. When the amplitude 502 rises past the higher threshold $T_H$ 538, if the absolute difference between the average reference phase and the average defect phase is not greater than a phase error threshold, the DFT2T1_R signal 558 is pulsed to indicate a type 1 defect, and if it is greater than the phase error threshold, the DFT2T2_R signal 560 is pulsed to indicate a type 2 defect.

The example amplitude 502 of FIG. 5 is used to disclose how some embodiments of the media defect classifier generate the various output signals and control signals. Although the corresponding phase error is not illustrated, the classification of type 1 defects versus type 2 defects operates as disclosed above. When the amplitude 502 drops below higher threshold $T_H$ 538 as at time 504, the media defect classifier stops the accumulation of the reference phase, turning off the Accumulate Reference Phase signal 552. When the amplitude 502 rises above higher threshold $T_H$ 538 as at time 506, the media defect classifier again starts accumulating the reference phase for the phase error calculation, asserting Accumulate Reference Phase signal 552. Because the amplitude 502 does not fall below threshold $T_E$ 540 between times 504 and 506, the DFT2MD signal 544 is not asserted. Because the amplitude 502 remains below higher threshold $T_H$ 538 only briefly between times 504 and 506 and not longer than the MMOD duration threshold, the DFT2MMOD signal 546 is not asserted. Because neither the DFT2MD signal 544 nor the DFT2MMOD signal 546 is asserted between times 504 and 506, the Defect Window signal 548 is not asserted, therefore the Accumulate Defect Phase signal 550 is not asserted, and the media defect classifier does not accumulate the defect phase between times 504 and 506.

When the amplitude 502 again drops below higher threshold $T_H$ 538 at time 508, the media defect classifier again stops the accumulation of the reference phase, turning off the Accumulate Reference Phase signal 552. When the amplitude 502 rises above higher threshold $T_H$ 538 at time 510, the media defect classifier again starts accumulating the reference phase for the phase error calculation, asserting Accumulate Reference Phase signal 552. Because the amplitude 502 remains below higher threshold $T_H$ 538 longer than the MMOD duration threshold between times 508 and 510, the DFT2MMOD signal 546 is asserted, causing the Defect Window signal 548 to be asserted over the extended DFT2MMOD signal 546, causing the Accumulate Defect Phase signal 550 to be asserted with the Defect Window signal 548. The media defect classifier therefore accumulates the defect phase between times 508 and 510.

When the amplitude 502 drops below higher threshold $T_H$ 538 at time 512, the media defect classifier again stops the accumulation of the reference phase, turning off the Accumulate Reference Phase signal 552. When the amplitude 502 drops below threshold $T_E$ 540 at time 514, the DFT2MD signal 544 is asserted. When the amplitude 502 rises above threshold $T_E$ 540 at time 516, the DFT2MD signal 544 is turned off. When the amplitude 502 rises above higher threshold $T_H$ 538 at time 518, the media defect classifier again starts accumulating the reference phase for the phase error calculation, asserting Accumulate Reference Phase signal 552. Because the amplitude 502 does not remain below higher threshold $T_H$ 538 longer than the MMOD duration threshold between times 512 and 518, the DFT2MMOD signal 546 is not asserted. However, when the amplitude 502 is below threshold $T_E$ 540 between times 514 and 516, the DFT2MD signal 544 is asserted. The Defect Window signal 548 is therefore asserted over the extended DFT2MD signal 544, causing the Accumulate Defect Phase signal 550 to be asserted with the Defect Window signal 548.

Up to time 518, the DFT2T1_F signal 554, DFT2T2_F signal 556, DFT2T1_R signal 558 and DFT2T2_R signal 560 are not pulsed, because the amplitude 502 has not fallen below the lower threshold $T_L$ 542.

When the amplitude 502 drops below higher threshold $T_H$ 538 at time 520, the media defect classifier again stops the accumulation of the reference phase, turning off the Accumulate Reference Phase signal 552. When the amplitude 502 drops below threshold $T_E$ 540 at time 522, the DFT2MD signal 544 is asserted. When the amplitude 502 has been below higher threshold $T_H$ 538 longer than the MMOD duration threshold, the DFT2MMOD signal 546 is asserted, and the Defect Window signal 548 is asserted at the extended beginning of the DFT2MMOD signal 546 assertion, which in this example is earlier than the extended beginning of the DFT2MD signal 544 assertion. The Accumulate Defect Phase signal 550 is asserted when the Defect Window signal 548 is asserted (with the amplitude 502 above the lower threshold $T_L$ 542.)

When the amplitude 502 falls below the lower threshold $T_L$ 542 at time 524, the Accumulate Defect Phase signal 550 is turned off, and the media defect classifier pulses either the DFT2T1_F signal 554 or the DFT2T2_F signal 556, depending on whether the phase error, or the absolute difference between the average reference phase and the average defect phase, is greater than the phase error threshold. Again, the phase error is not shown in FIG. 5, but is shown and explained above with respect to FIGS. 2A-4B. In this example, the phase error, or absolute difference between the average reference phase and the average defect phase, is not greater than the phase error threshold at time 524, so the DFT2T1_F signal 554 is pulsed and the DFT2T2_F signal 556 is not, indicating a falling edge type 1 defect.

The amplitude 502 briefly rises above lower threshold $T_L$ 542 between times 528 and 530, again asserting Accumulate Defect Phase signal 550 because the Defect Window signal 548 is still asserted. The DFT2T1_F signal 554, DFT2T2_F signal 556, DFT2T1_R signal 558 and DFT2T2_R signal 560 are not pulsed at time 530 because the amplitude 502 has not fallen from above higher threshold $T_H$ 538 to below lower threshold $T_L$ 542.

When the amplitude 502 rises above lower threshold $T_L$ 542 at time 532, the Accumulate Defect Phase signal 550 is again asserted. When the amplitude 502 rises above threshold $T_E$ at time 534, the DFT2MD signal 544 is turned off. When the amplitude 502 rises above higher threshold $T_H$ 538 at time 536, the media defect classifier again starts accumulating the reference phase for the phase error calculation, asserting Accumulate Reference Phase signal 552. At the end of extended DFT2MMOD signal 546, the Defect Window signal 548 is turned off. The Accumulate Defect Phase signal 550 will have turned off just before, when the amplitude 502 rose above higher threshold $T_H$ 538 at time 536.

When the amplitude 502 rises above the higher threshold $T_H$ 538 at time 524, the media defect classifier pulses either the DFT2T1_R signal 558 or the DFT2T2_R signal 560, depending on whether the phase error, the absolute difference between the average reference phase and the average defect phase, is greater than the phase error threshold. Again, the phase error is not shown in FIG. 5, but is shown and explained above with respect to FIGS. 2A-4B. In this example, the phase error, or absolute difference between the average reference phase and the average defect phase, is greater than the phase error threshold by time 536, so the DFT2T2_R signal 560 is pulsed and the DFT2T1_R signal 558 is not, indicating a rising edge type 2 defect.

In some embodiments, the media defect classifier generates these output signals and control signals based on other conditions or logic. In some other embodiments, other output signals and control signals are generated in the media defect classifier to track the amplitude and phase shift for use in detecting and classifying media defects. For example, some embodiments do not generate a DFT2MMOD signal 546, and the Defect Window signal 548 is based only on the DFT2MD signal 544. In some embodiments, the DFT2MD signal 544 and the DFT2MMOD signal 546, if present, are not extended.

Figure 6:
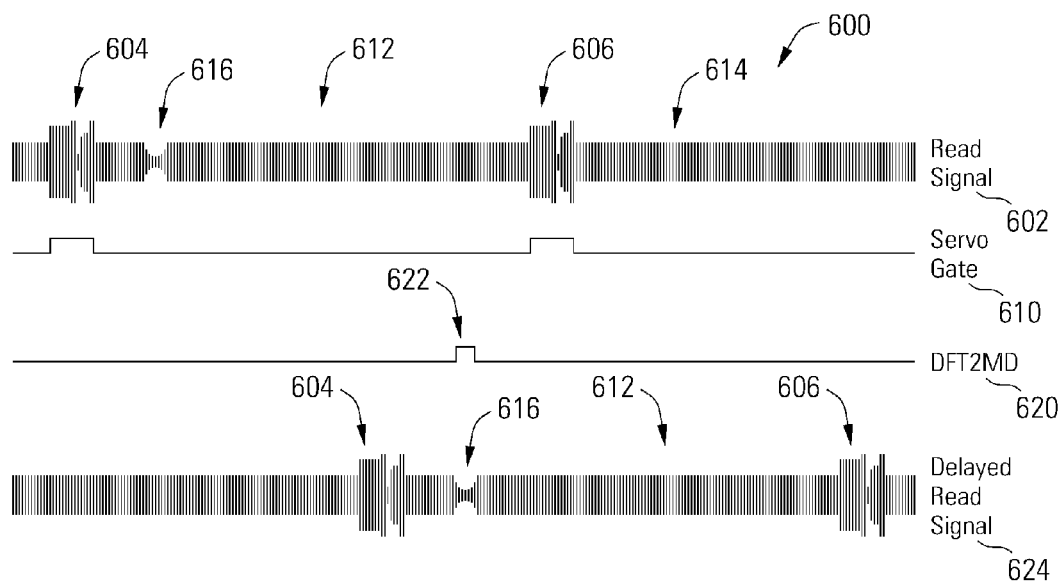
FIG. 6 is a timing diagram depicting latency of media defect classifier output based on an input read signal in accordance with some embodiments of the present inventions.

Turning to FIG. 6, the latency of the output signals from the media defect classifier based on an input read signal 602 are illustrated in timing diagram 600 in accordance with some embodiments of the present inventions. Read signal 602 is derived, for example, from servo regions and user data regions read from a magnetic hard disk with a read/write head assembly. Servo regions 604 and 606 are read during a servo gate 610. Servo regions may include a servo pattern to enable a read channel to locate a servo wedge on the disk platter containing a servo region, a servo address mark identifying the servo region, a Gray code and burst data with location information, etc. Servo regions 604 and 606 are followed by user data regions 612 and 614. An amplitude dropout 616 in the user data region 612 due to a media defect on the disk platter is detected by a media defect classifier, causing a DFT2MD signal 620 to be asserted at time 622, along with other control signals not shown in FIG. 6.

Notably, defect signals from the media defect classifier have the same latency as the data detection. The latency in a delayed read signal 624 that arises in the read channel when processing the read signal 602, including filtering, detecting, and decoding, also arises in the output signals (e.g., DFT2MD 620) from the media defect classifier. The DFT2MD signal 620, asserted at time 622 in response to amplitude dropout 616, thus rises as the data in the delayed read signal 624 corresponding to the start of the defect crosses the NRZ bus in the read channel.

Figure 7:
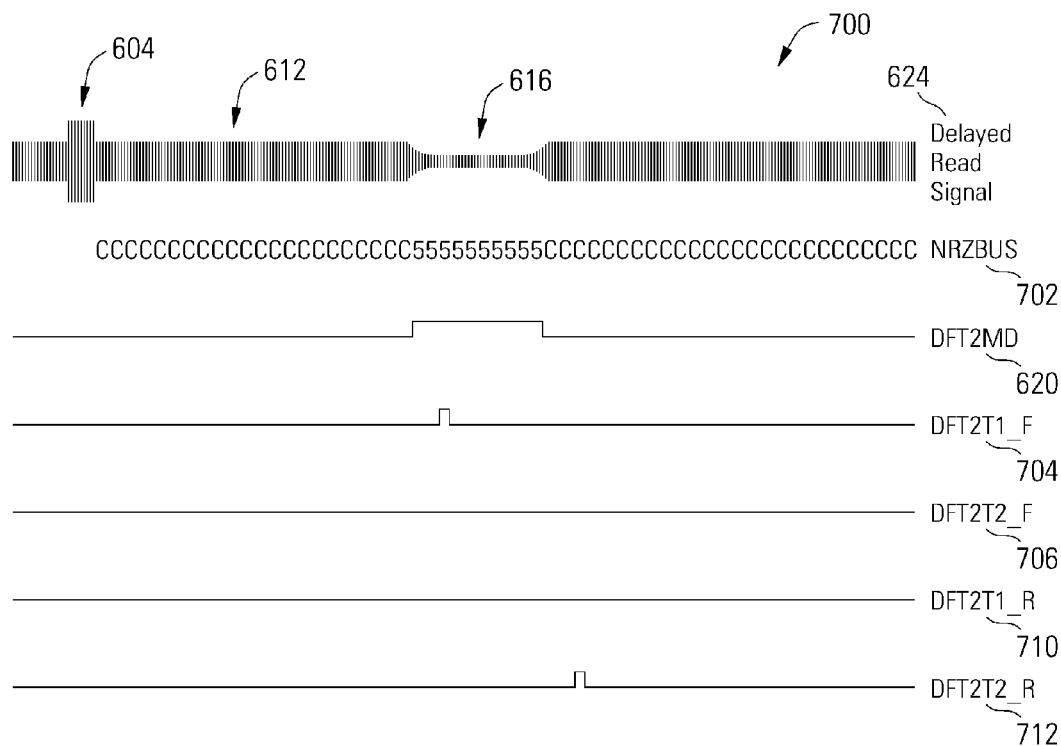
FIG. 7 is a timing diagram depicting a detail view of the signal latency in FIG. 6 in accordance with some embodiments of the present inventions.

Turning to FIG. 7, a detail view of the amplitude dropout 616 in the delayed read signal 624 is depicted in timing diagram 700. The DFT2MD signal 620 is asserted when amplitude dropout 616 occurs in the delayed read signal 624 and when data with errors (denoted as a stream of '5's) crosses the NRZ bus 702. With the amplitude dropout 616 being the same as or similar to the example media defect and amplitude dropout 526 of FIG. 5, the media defect classifier asserts the DFT2T1_F signal 704 shortly after the DFT2MD signal 620 is asserted, indicating a falling edge type 1 media defect. The DFT2T2_F signal 706 and DFT2T1_R signal 710 are not asserted, because the media defect classifier does not detect a falling edge type 2 defect nor a rising edge type 1 defect. The DFT2T2_R signal 712 is asserted shortly after the DFT2MD signal 620 is turned off, indicating a rising edge type 2 defect.

Turning to FIG. 8, an example of a media defect classifier 800 that may be used to detect and classify media errors is disclosed in accordance with some embodiments of the present inventions. Such a media defect classifier 800 may be included, for example, in a read channel or in test equipment for a magnetic hard disk. The media defect classifier 800 includes an analog front end circuit 804 that receives and processes an analog signal 802 from the read/write head assembly of a magnetic hard disk. Analog front end 804 may include, but is not limited to, an analog filter and an amplifier circuit as are known in the art. For example, the analog front end 804 may include an AC coupler (ACC) or high pass filter, a variable gain amplifier (VGA), a compensation circuit for the magneto-resistive asymmetry (MRA) characteristic of a magnetic write head, etc. Based upon the disclosure provided herein, one of ordinary skill in the art will recognize a variety of circuitry that may be included as part of analog front end circuit 804. Analog front end circuit 804 receives and processes the analog signal 802, and provides a processed analog signal 806 to an analog to digital converter circuit 810.

Analog to digital converter circuit 810 converts processed analog signal 806 into a corresponding series of digital samples 812. Analog to digital converter circuit 810 may be any circuit known in the art that is capable of producing digital samples corresponding to an analog input signal 806. Based upon the disclosure provided herein, one of ordinary skill in the art will recognize a variety of analog to digital converter circuits that may be used in relation to different embodiments of the present inventions.

Digital samples 812 are provided to an A+BD filter 814, which in some embodiments is a two tap finite impulse response (FIR) filter. The A+BD filter 814 normalizes the gain and phase of the digital samples 812 so that the ideal sampling instants of the digital samples at output 816 are at peaks and zero crossings. Depending on how the read channel is configured, the ideal sampling instants at the output of the analog to digital converter circuit 810 may not necessarily be, for a periodic sequence of 4 samples, at peaks and zero crossings, and the A+BD filter 814 may be used to transform the ideal sampling instants to peaks and zero crossings. In some embodiments, the read channel is configured so that the ideal sampling instants at the output of the analog to digital converter circuit 810 are at peaks and zero crossings, and in these embodiments, A+BD filter 814 may be omitted. The output 816 of A+BD filter 814 is provided in some embodiments to a 2T bandpass filter, a 1, 0, −1 filter that is cascaded 8 times in some cases, yielding filtered samples 822.

The filtered samples 822 is provided to a Discrete Fourier Transform (DFT) circuit 824, which computes real and imaginary (I/Q) components for a sinusoid in the filtered samples 822 over a selectable sliding window, yielding one pair of outputs every four clock cycles or 4T. The size of the sliding window may be set as desired, for example selecting a brief 4T window for simple calculations or a longer 8T or 16T window, etc. In some embodiments with a sinusoid having a period of 4T over a 4T window and a 2T DFT 824, the 2T-DFT computes a sin and a cosine term for the pattern that has a period of 4 samples. A period of four samples provides particularly simple calculations because no multiplication is needed, only addition and subtraction according to Equations 1 and 2:

$$\text{real} = \text{sum}\left(x_n \cdot \cos\left(\frac{n \cdot 2 \cdot \pi}{\text{period}}\right)\right) \quad \text{(Eq 1)}$$

$$\text{imag} = \text{sum}\left(x_n \cdot \sin\left(\frac{n \cdot 2 \cdot \pi}{\text{period}}\right)\right) \quad \text{(Eq 2)}$$

The sinusoid with a period of 4 samples, sampled at peaks and zeros over a period $[x_0\ x_1\ x_2\ x_3]$, computes the sin term of Equation 2 as $\sin(n \cdot \pi/2) = [0\ 1\ 0\ -1]$ and the cos term of Equation 1 as $\cos(n \cdot \pi/2) = [1\ 0\ -1\ 0]$. The real and imaginary calculations in Equations 1 and 2 reduce to real=$x_0-x_2$, imag=$x_1-x_3$ for the example sinusoid with a period of 4 samples, where $x_0$ through $x_3$ are the terms being added in Equations 1 and 2. In an embodiment with an 8T window, the real and imaginary calculations in Equations 1 and 2 reduce to real=$x_0-x_2+x_4-x_6$, imag=$x_1-x_3+x_5-x_7$.

The real and imaginary components in the output 826 of DFT 824 are used to calculate the amplitude and phase of the signal. In some embodiments, this is done using a a COordinate Rotation DIgital Computer (CORDIC) 830, a circuit that performs trigonometric functions by rotating vectors in iterative or pipelined fashion. The CORDIC 830 yields in output 832 an amplitude being sqrt(real^2+imag^2), and a phase being atan(imag/real).

A classifier 834 interprets the amplitude and phase calculated by CORDIC 830 or by an alternative calculation circuit to detect and classify media defects, yielding output signals such as DFT2MD 836, DFT2T1 840 and DFT2T 842 for an embodiment that does not differentiate between falling and rising amplitude edge media defects. In other embodiments, classifier 834 may output, for example, DFT2MD, DFT2T1_F, DFT2T2_F, DFT2T1_R and DFT2T2_R signals.

Turning to FIG. 9, a classifier circuit 900 is disclosed that may be used in a media defect classifier 800 in accordance with some embodiments of the present inventions. Inputs to the classifier circuit 900 include the amplitude 902 and phase 904 calculated by a CORDIC or other calculating circuit, based on the real and imaginary (I/Q) components calculated by the DFT 824 for a sinusoidal signal read from a storage medium. Outputs from the classifier circuit 900 include DFT2MD 906, DFT2T1_F 910, DFT2T2_F 912, DFT2T1_R 914 and DFT2T2_R 916.

A DFT2MD generator 922 receives the amplitude 902 and a threshold $T_E$ 920. DFT2MD generator 922 includes a comparator to compare the amplitude 902 with the threshold $T_E$ 920, asserting output DFT2MD 906 when amplitude 902<threshold $T_E$ 920. The DFT2MD generator 922 also yields an extended DFT2MD 930, asserting the extended DFT2MD 930 4T earlier than DFT2MD 906 and turning off extended DFT2MD 930 4T later than DFT2MD 906. Based upon the disclosure provided herein, one of ordinary skill in the art will recognize a variety of circuits or code to implement the comparator and to extend DFT2MD 906 to yield extended DFT2MD 930 in DFT2MD generator 922, as well as the circuits or code to implement the other elements of the classifier circuit 900.

A DFT2MMOD generator 926 receives the amplitude 902 and a higher threshold $T_H$ 924. DFT2MMOD generator 926 includes a comparator to compare the amplitude 902 with the higher threshold $T_H$ 924, asserting output extended DFT2MMOD 932 when amplitude 902<higher threshold $T_H$ 924 for a length of time at least as long as an MMOD duration threshold. MMOD duration threshold may be set at any desired level to filter out brief glitches, for example 32T. The DFT2MMOD generator 926 also extends the assertion time of the extended DFT2MMOD 932, so that it is asserted earlier than the point at which the comparison condition has been met for the MMOD duration threshold, and remains asserted for a brief time after the comparison condition is no longer met.

A defect window generator 934 receives extended DFT2MD 930 and extended DFT2MMOD 932 and performs a logical OR on them to yield a defect window signal 938. An average defect phase generator 940 accumulates the phase 904 when the defect window signal 938 is asserted and the amplitude 902 is between higher threshold $T_H$ 924 and lower threshold $T_L$ 936, or $T_L$<amplitude<$T_H$. The defect window generator 934 may use any suitable accumulator or averaging circuit on the phase 904, with the accumulation or averaging enabled when the conditions disclosed above are met. The average defect phase generator 940 yields an average defect phase 944. An average reference phase generator 942 accumulates the phase 904 when the amplitude 902 is greater than higher threshold $T_H$ 924 to yield an average reference phase 946.

A phase error calculator 950 calculates the absolute value of the difference between the average defect phase 944 and the average reference phase 946 to yield a phase error 948.

A falling edge classifier 954 classifies media defects at the falling edge of amplitude dropouts based on the amplitude 902 and the phase error 948. When the amplitude 902 falls from above the higher threshold $T_H$ 924 to below the lower threshold $T_L$ 936, the falling edge classifier 954 pulses either the DFT2T1_F output 910, indicating a type 1 media defect, or the DFT2T2_F output 912, indicating a type 2 media defect. If the phase error 948 is greater than a phase error threshold 952, the falling edge classifier 954 pulses the DFT2T2_F output 912. Otherwise, the falling edge classifier 954 pulses the DFT2T1_F output 910. (Again, the type 1 media defect disclosed herein is not associated with a substantial phase error, the type 2 media defect is.)

A rising edge classifier 956 classifies media defects at the rising edge of amplitude dropouts based on the amplitude 902 and the phase error 948. When the amplitude 902 rises from below the lower threshold $T_L$ 936 to above the higher threshold $T_H$ 924, the rising edge classifier 956 pulses either the DFT2T1_R output 914, indicating a type 1 media defect, or the DFT2T2_R output 916, indicating a type 2 media defect. If the phase error 948 is greater than a phase error threshold 952, the rising edge classifier 956 pulses the DFT2T2_R output 916. Otherwise, the rising edge classifier 956 pulses the DFT2T1_R output 914.

Figure 10:
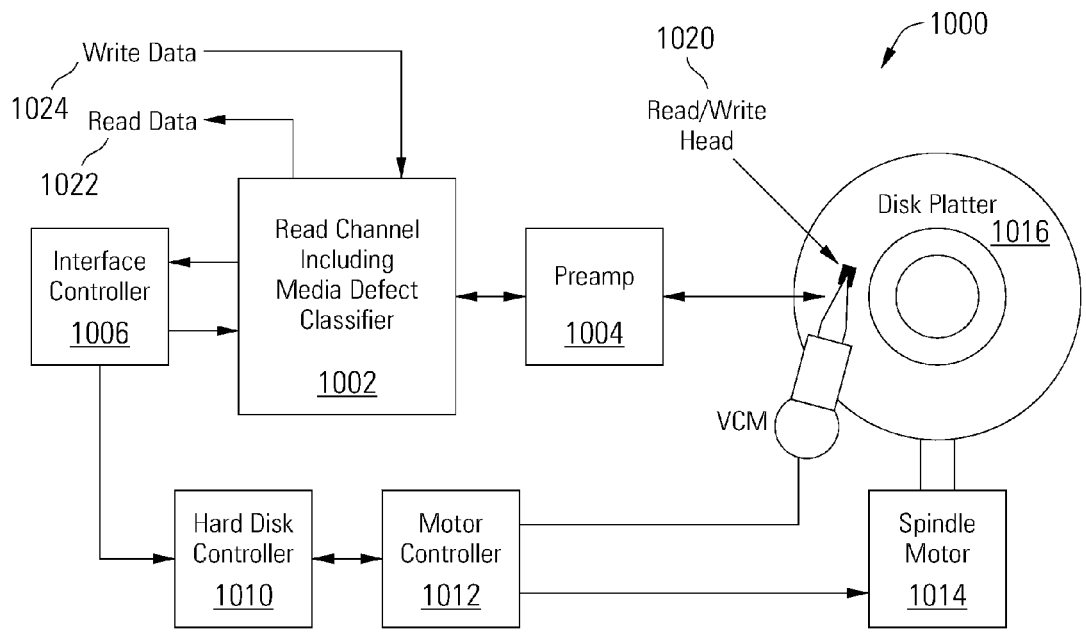
FIG. 10 depicts a storage system with a media defect classifier in accordance with some embodiments of the present inventions.

Turning to FIG. 10, a storage system 1000 is illustrated as an example application of a media defect classifier in accordance with some embodiments of the present invention. Again, the media defect classifier may be used in a read channel of an operating hard disk drive, or in test equipment used during manufacturing of storage media, etc. The storage system 1000 includes a read channel circuit 1002 with a media defect classifier in accordance with some embodiments of the present invention. Storage system 1000 may be, for example, a hard disk drive. Storage system 1000 also includes a preamplifier 1004, an interface controller 1006, a hard disk controller 1010, a motor controller 1012, a spindle motor 1014, a disk platter 1016, and a read/write head assembly 1020. Interface controller 1006 controls addressing and timing of data to/from disk platter 1016. The data on disk platter 1016 consists of groups of magnetic signals that may be detected by read/write head assembly 1020 when the assembly is properly positioned over disk platter 1016. In one embodiment, disk platter 1016 includes magnetic signals recorded in accordance with either a longitudinal or a perpendicular recording scheme.

In a typical read operation, read/write head assembly 1020 is accurately positioned by motor controller 1012 over a desired data track on disk platter 1016. Motor controller 1012 both positions read/write head assembly 1020 in relation to disk platter 1016 and drives spindle motor 1014 by moving read/write head assembly 1020 to the proper data track on disk platter 1016 under the direction of hard disk controller 1010. Spindle motor 1014 spins disk platter 1016 at a determined spin rate (RPMs). Once read/write head assembly 1020 is positioned adjacent the proper data track, magnetic signals representing data on disk platter 1016 are sensed by read/write head assembly 1020 as disk platter 1016 is rotated by spindle motor 1014. The sensed magnetic signals are provided as a continuous, minute analog signal representative of the magnetic data on disk platter 1016. This minute analog signal is transferred from read/write head assembly 1020 to read channel circuit 1002 via preamplifier 1004. Preamplifier 1004 is operable to amplify the minute analog signals accessed from disk platter 1016. In turn, read channel circuit 1002 decodes and digitizes the received analog signal to recreate the information originally written to disk platter 1016. This data is provided as read data 1022 to a receiving circuit. During a testing sequence or during normal operation, the media defect classifier in read channel circuit 1002 detects media defects on the disk platter 1016. Such a media defect classifier may be implemented consistent with the disclosure above in relation to FIGS. 1-9. In some cases, the data detection may be performed consistent with the flow diagram disclosed below in relation to FIG. 11. A write operation is substantially the opposite of the preceding read operation with write data 1024 being provided to read channel circuit 1002 and written to disk platter 1016.

It should be noted that storage system 1000 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such storage system 1000, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

It should be noted that the various blocks discussed in the above application may be implemented in integrated circuits along with other functionality. Such integrated circuits may include all of the functions of a given block, system or circuit, or a portion of the functions of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

Figure 11:
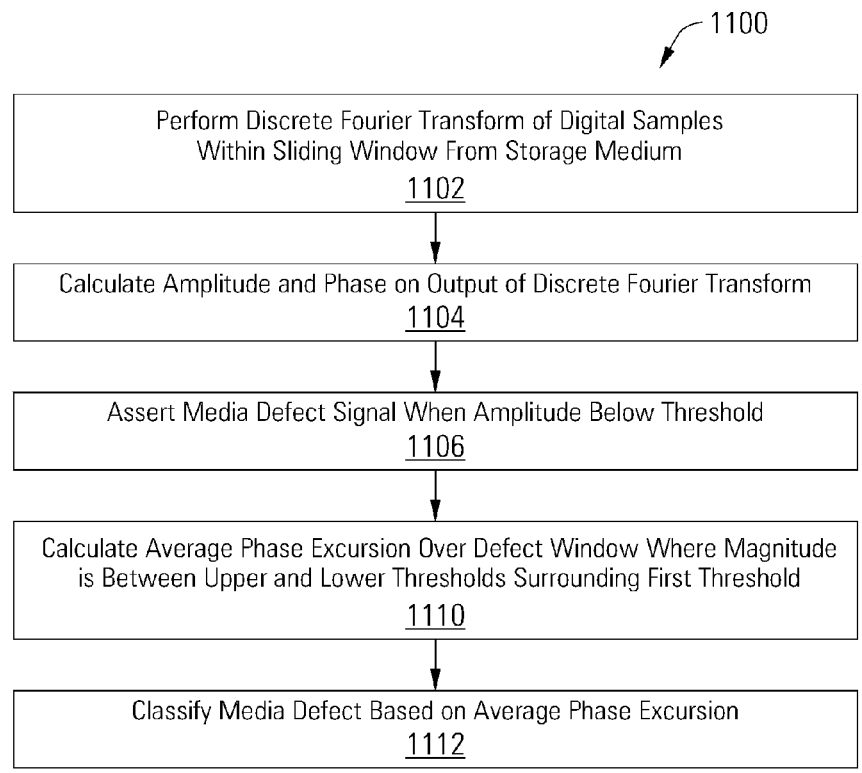
FIG. 11 is a flow diagram of an operation for detecting and classifying a media defect in accordance with some embodiments of the present inventions.

Turning to FIG. 11, a flow diagram 1100 depicts an operation for detecting and classifying a media defect in accordance with one or more embodiments of the present inventions. Following flow diagram 1100, a Discrete Fourier Transform is performed on digital samples within a sliding window read from a storage medium. (Block 1102) The DFT yields real and imaginary components of a sinusoid in the digital samples. The digital samples may be generated by processing an analog signal in an analog front end, analog to digital converter, A+BD FIR filter, and 2T bandpass filter, for example.

The amplitude and phase is calculated on the real and imaginary components from the DFT. (Block 1104) In some embodiments, a CORDIC is used to calculate the amplitude and phase. A media defect signal is asserted when the amplitude is below a first threshold. (Block 1106) The average phase excursion or error in the digital samples is calculated over a defect window where the magnitude is between upper and lower thresholds surrounding first threshold. (Block 1110) The average phase excursion is calculated in some embodiments by accumulating a reference phase over a read event during the absence of an amplitude dropout, accumulating a defect phase over the read event during defect conditions, and calculating the average phase excursion as the absolute difference between the average reference phase and the average phase. The media defect is classified based on the average phase excursion. (Block 1112) For example, a first type of media defect may be identified that is not associated with a substantial phase error, and a second type of media defect may be identified that is associated with a substantial phase error. The media defect may also be differentiated between falling and rising edges of amplitude dropouts.

In conclusion, the present invention provides novel apparatuses and methods for detecting and classifying media defects. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. An apparatus for classifying a media defect comprising:
 a Discrete Fourier Transform circuit operable to yield real and imaginary components of a signal derived from data read from a storage medium;
 a calculation circuit operable to calculate an amplitude and a phase of the signal based on the real and imaginary components; and
 a classifier operable to detect the media defect based on the amplitude and to classify the media defect based on the phase.

2. The apparatus of claim 1, wherein the calculation circuit comprises a coordinate rotation digital computer.

3. The apparatus of claim 1, further comprising a finite impulse response filter operable to transform digital samples in the data read from the storage medium so that samples correspond with peaks and zero crossings.

4. The apparatus of claim 1, wherein the classifier is operable to establish a defect window during which the media defect is classified.

5. The apparatus of claim 4, wherein the classifier comprises a media defect signal generator operable to detect a media defect when the amplitude drops below a threshold.

6. The apparatus of claim 5, wherein the classifier comprises:
 an error signal generator operable to determine when the amplitude has been below a higher threshold for a predetermined duration; and
 a defect window generator operable to establish the defect window when an output of the media defect signal generator is asserted or when an output of the error signal generator is asserted.

7. The apparatus of claim 4, wherein the classifier comprises an average reference phase generator operable to accumulate an average reference phase when the amplitude is greater than a threshold.

8. The apparatus of claim 1, wherein the classifier comprises an average defect phase generator operable to accumulate an average defect phase during a defect window when the amplitude is between a higher threshold and a lower threshold.

9. The apparatus of claim 1, wherein the classifier comprises a phase error calculator operable to generate a phase error as an absolute value of a difference between an average reference phase and an average defect phase.

10. The apparatus of claim 1, wherein the classifier is operable to classify the media defect as a first type media defect when a phase error is below a phase error threshold and as a second type media defect when the phase error is above a phase error threshold.

11. The apparatus of claim 1, wherein the classifier comprises a falling edge classifier operable to identify a type 1 media defect when the amplitude has fallen from a higher threshold to a lower threshold and a phase error is below a phase error threshold, and to identify a type 2 media defect when the amplitude has fallen from the higher threshold to the lower threshold and the phase error is above the phase error threshold.

12. The apparatus of claim 1, wherein the classifier comprises a rising edge classifier operable to identify a type 1 media defect when the amplitude has risen from a lower threshold to a higher threshold and a phase error is below a phase error threshold, and to identify a type 2 media defect when the amplitude has risen from the lower threshold to the higher threshold and the phase error is above the phase error threshold.

13. The apparatus of claim 1, wherein the Discrete Fourier Transform circuit, the calculation circuit and the classifier are implemented as an integrated circuit.

14. The apparatus of claim 1, wherein the Discrete Fourier Transform circuit, the calculation circuit and the classifier are incorporated in a storage device.

15. A method for classifying a media defect, comprising:
    performing a Discrete Fourier Transform on a signal read from a storage medium;
    calculating an amplitude and a phase from an output of the Discrete Fourier Transform;
    identifying the media defect when the amplitude falls below a first threshold;
    calculating a phase error within a defect window in which the amplitude is between a higher threshold and a lower threshold surrounding the first threshold; and
    classifying the media defect based on the phase error.

16. The method of claim 15, further comprising filtering the signal so that digital samples in the signal are at peaks and zero crossings.

17. The method of claim 15, further comprising calculating the phase error as an absolute value of an average reference phase and an average defect phase.

18. The method of claim 15, further comprising classifying the media defect as a first type if the phase error is below a phase error threshold and as a second type if the phase error is above the phase error threshold.

19. The method of claim 15, further comprising differentiating the media defect based on whether the phase error was calculated at a falling edge of the amplitude or a rising edge.

20. A storage system comprising:
    a storage medium maintaining a data set;
    a read/write head assembly operable to sense the data set on the storage medium; and
    a media defect classifier operable to classify a media defect based on the data set, comprising:
      a Discrete Fourier Transform circuit operable to yield real and imaginary components of a signal derived from the data set;
      a calculation circuit operable to calculate an amplitude and a phase of the signal based on the real and imaginary components; and
      a classifier operable to detect the media defect based on the amplitude and to classify the media defect based on the phase.

21. The storage system of claim 20, wherein the storage medium comprises a hard disk drive.

22. The storage system of claim 20, wherein the storage medium comprises a redundant array of independent disks.

* * * * *